(12) United States Patent
Fine et al.

(10) Patent No.: US 6,772,453 B2
(45) Date of Patent: Aug. 10, 2004

(54) HOT WATER FAUCET LOCK

(76) Inventors: Jonathan Fine, 1386 Beacon St. #13, Brookline, MA (US) 02446; Mark Lindholm, 21 Pebble Stone La., Hamburg, NJ (US) 07419

( * ) Notice: Subject to any disclaimer, the term of this patent is extended or adjusted under 35 U.S.C. 154(b) by 187 days.

(21) Appl. No.: 09/762,000

(22) Filed: Jan. 17, 2001

(65) Prior Publication Data

US 2002/0092092 A1 Jul. 18, 2002

(51) Int. Cl.[7] .............................................. E04C 1/00
(52) U.S. Cl. .............................. 4/654; 4/661; 137/382
(58) Field of Search ................... 4/654, 661; 137/382, 137/383, 385; 70/175, 177; 251/90, 89, 101, 102, 104, 95

(56) References Cited

U.S. PATENT DOCUMENTS 2,659,389 A * 11/1953 Herbert ....................... 251/143
5,394,715 A * 3/1995 Guerette ....................... 70/177
5,588,316 A * 12/1996 Jones ....................... 137/382 X
5,927,111 A * 7/1999 Nachbauer ............... 137/382 X

* cited by examiner

Primary Examiner—Charles E. Phillips
(74) Attorney, Agent, or Firm—Lambert & Associates; Gary E. Lambert; Patrick D. Archibald

(57) ABSTRACT

A faucet lock for use with a lavatory sink faucet having at least one water valve control handle, the faucet lock comprising a base, a bracket, having first and second ends thereof, wherein the first end is adjustably attached to the base such that the second end is positionable adjacent to the control handle preventing the control handle from opening the water valve, thus locking the water valve in a closed position, wherein the faucet lock prevents small children, disabled persons and others from unauthorized use of the water valve. The present invention faucet lock is a safety device to protect children and others especially special needs persons with spasticity or other disabilities from accidentally being exposed to hot water.

1 Claim, 2 Drawing Sheets

HOT WATER FAUCET LOCK

FIELD OF THE INVENTION

The present invention relates generally to a hot water faucet lock, and in particular to a faucet locking device designed for use with a typical lavatory faucet having blade type faucet handles. The device of the present invention locks a faucet handle preventing the unauthorized use of a water valve by small children or others including special needs persons.

BACKGROUND OF THE INVENTION

Many prior art faucet locking devices exist in the art and are designed for specific applications or purposes. For example, U.S. Pat. No. 5,557,955 to Kinsella discloses a hot water faucet locking device for use with a bathtub style faucet arrangement. U.S. Pat. No. 5,590,682 to Fischer teaches a water faucet rotation prevention device that prevents inadvertent and unwanted rotation of bathtub water faucet valves.

Many other prior art devices exist designed to prevent the unauthorized use of water faucets for both lavatory sinks as well as bathtub faucet arrangements. The device of the present invention discloses a novel and unique faucet locking device to be used with typical lavatory sinks having blade type faucet handle arrangements.

SUMMARY OF THE INVENTION

The present invention hot water faucet lock was designed especially for the safety of children with physical disabilities. It is designed as a safety device to protect children and others with spasticity or other disabilities from accidentally being exposed to hot water. Hot tap water from lavatory sinks can burn the skin of small children or even adults. Even if the tap water is not hot enough to cause serious burns it can cause discomfort or even scare a child. Many institutions have lavatory sinks having wrist-blade or blade-type faucet handles to operate the water valves. The present invention faucet locking device is designed to fit behind the faucet on a typical sink and lock the faucet handle, preventing inadvertent or accidental use of the water valves especially hot water valves. The device comprises a base having a one or more adjustable brackets which are easily positionable adjacent to the faucet handle preventing the faucet handle from being turned on. The present invention faucet lock device can be easily removed by an adult or other person authorized to use the water faucet. Other embodiments of the present invention include both a first and second bracket adjustably attached one to the other such that the locking device is adjustable both in height and length so that it can be used with a variety of faucet configurations.

The present invention faucet lock can also be used to limit the available volume of water. The adjustable brackets of the faucet lock assembly can be adjusted to allow the faucet handle to be partially rotated allowing some water to flow while restricting full rotation of the faucet handle. The adjustable brackets described herein provide a full range of motion of the faucet handle and therefore can be set to allow the flow of any portion of the volume of available water.

Obviously all components of the present invention can be constructed of any suitable materials including plastic, metal, wood or any combination thereof. One embodiment of the present invention also includes the availability for the use of a second lock such as a keyed lock or padlock to secure the faucet from unauthorized use.

Accordingly, it is the primary object of the present invention to provide a faucet locking device of relatively simple and inexpensive construction for locking a faucet handle in the off position.

Another object of the present invention is to provide a faucet locking device comprising brackets that are capable of universal mounting to control both hot and cold water faucet handles independently, while also providing adjustability to both the length and height of the brackets, such that the faucet locking device can be used with a wide variety of faucet handles, in particular blade type faucet handles.

Another object is to provide a faucet lock for use with a lavatory sink faucet having at least one water valve control handle, the faucet lock comprising a base, a bracket, having first and second ends thereof, wherein the first end is adjustably attached to the base such that the second end is positionable adjacent to the control handle preventing the control handle from opening the water valve, thus locking the water valve in a closed position, wherein the faucet lock prevents small children, disabled persons and others from unauthorized use of the water valve.

A further object of the present invention is to provide a faucet lock wherein the base is disposed on a rear portion of the sink.

Another object of the present invention is to provide a faucet lock wherein the base is positioned rearward of the sink.

Another object of the present invention is to provide a faucet lock wherein the base further comprises a plurality of brackets for locking a plurality of water valves.

Another object of the present invention is to provide a faucet lock comprising a bracket such that the bracket attaches to the base at variable heights.

Another object of the present invention is to provide a faucet lock comprising a bracket wherein the bracket attaches to the base at variable lengths.

Another object of the present invention is to provide a faucet lock comprising a bracket which adjusts to limit rotation of a faucet handle for providing variable limited use of the water valve.

Yet another object of the present invention is to provide a faucet lock wherein the faucet lock further comprises a second lock securing the bracket in the position adjacent the control handle.

Another object of the present invention is to provide a faucet lock wherein the control handle is a hot water control handle.

Another object of the present invention is to provide a faucet lock wherein the bracket comprises flexible and positionable material wherein the faucet is locked when the bracket is positioned around the control handle preventing the control handle from opening the water valve.

Still another objective of the present invention is to provide a faucet lock for use with a lavatory sink having at least one water valve control handle, the faucet lock comprising a base, a first bracket attached to the base, a second bracket having first and second ends thereof, wherein the first end adjustably attaches to the first bracket such that the second end is positionable adjacent to the control handle preventing the control handle from opening the water valve, thus locking the faucet in a closed position, wherein the faucet lock prevents small children, disabled persons and others from unauthorized use of the water valve.

Another object of the present invention is to provide a faucet lock comprising first and second brackets wherein the base is disposed on a rear portion of said sink.

Another object of the present invention is to provide a faucet lock comprising first and second brackets wherein the base is positioned rearward of said sink.

Another object of the present invention is to provide a faucet lock having first and second brackets wherein the base further comprises a plurality of the brackets for locking a plurality of water valves.

Another object of the present invention is to provide a faucet lock having first and second brackets wherein the brackets attach to the base at variable heights.

Another object of the present invention is to provide a faucet lock having first and second brackets wherein the brackets attach to the base at variable lengths.

Another object of the present invention is to provide a faucet lock having first and second brackets wherein the faucet lock further comprises a second lock securing the brackets in a position adjacent the control handle.

Another object of the present invention is to provide a faucet lock having first and second brackets wherein the control handle is a hot water control handle.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

DETAILED DESCRIPTION OF THE PREFERRED EMBODIMENT

Detailed preferred embodiments of the present invention are disclosed. It is to be understood, however, that the disclosed embodiments are merely exemplary of the invention, which may be embodied in various forms. Therefore, specific structural and functional details disclosed are not to be interpreted as limiting, but rather as a representative basis for teaching one skilled in the art to variously employ the present invention in virtually any appropriately detailed system or structure. It will be understood that the drawings are not necessarily to scale, and relative component sizes may be exaggerated to facilitate an understanding of the invention.

The present invention relates to a faucet locking device designed to eliminate accidental or inadvertent use of water faucets especially hot water faucets. Although the present invention faucet lock is designed to be used with typical lavatory sinks having blade type faucet handles, this device can be used in a wide variety of embodiments as described above and claimed in the following claims.

Figure 1:
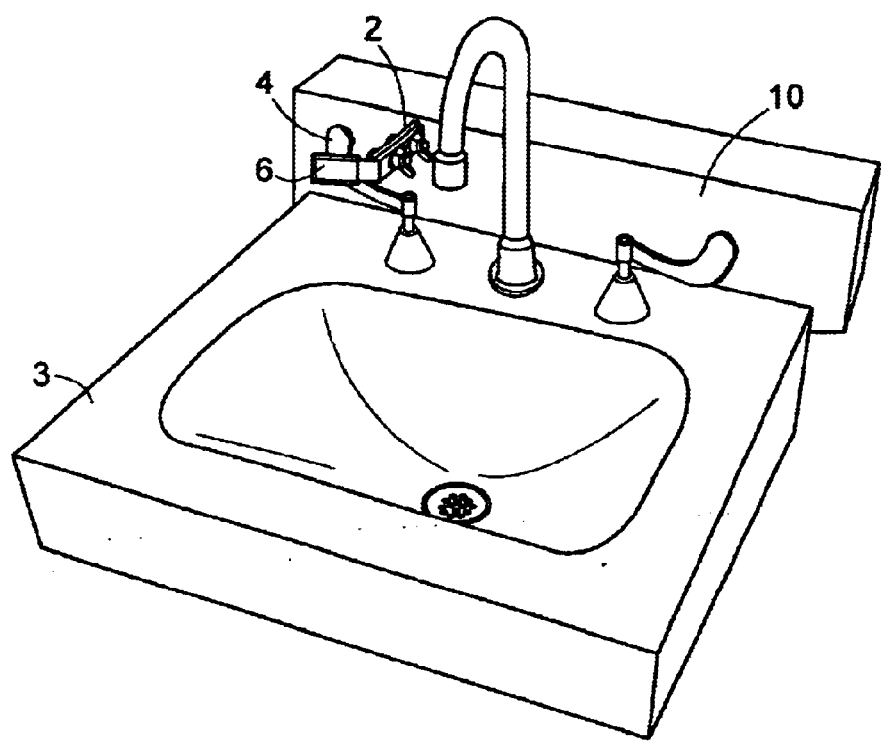
FIG. 1 is a perspective view of the present invention in use on a typical lavatory sink.

Referring to the drawings, wherein like numerals represent like parts throughout the several views, FIG. 1 shows the present invention faucet lock, generally 1, as used on a typical lavatory sink 3. Base 10 is disposed on a rear portion of sink 3. Bracket 2 is adjustably attached to base 10 and positioned such that an end thereof is adjacent hot water faucet control handle 4. Rubber cap 6 attached to bracket 2 protects faucet control handle 4 from damage.

Figure 2:
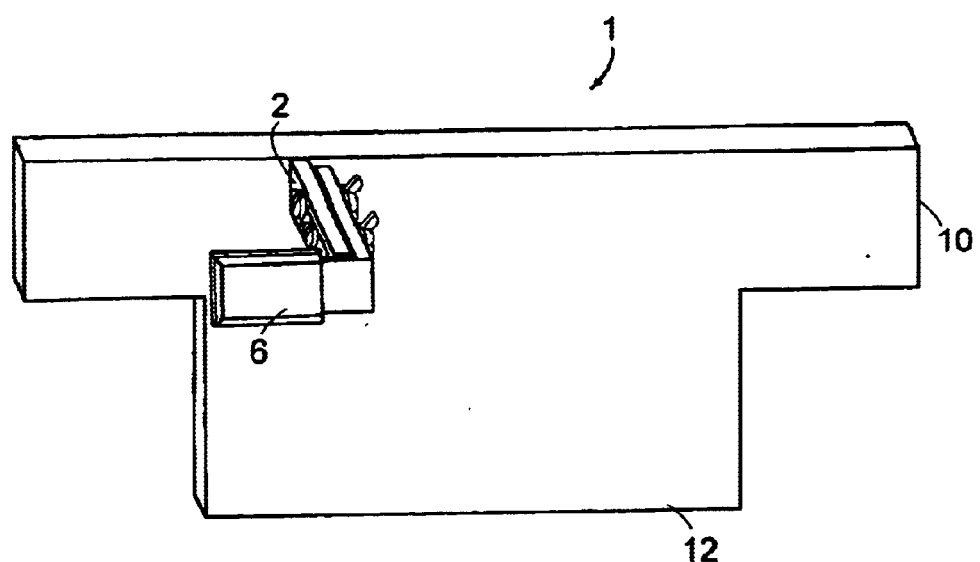
FIG. 2 is a perspective view of an embodiment of the present invention having a base for use with a sink mounted apart from a wall.

FIG. 2 shows an embodiment of the present invention faucet lock 1 having base 10 designed for use with a typical lavatory sink which mounts away from a wall. Lower portion 12 of base 10 fits between typical lavatory sink supports.

Figure 3:
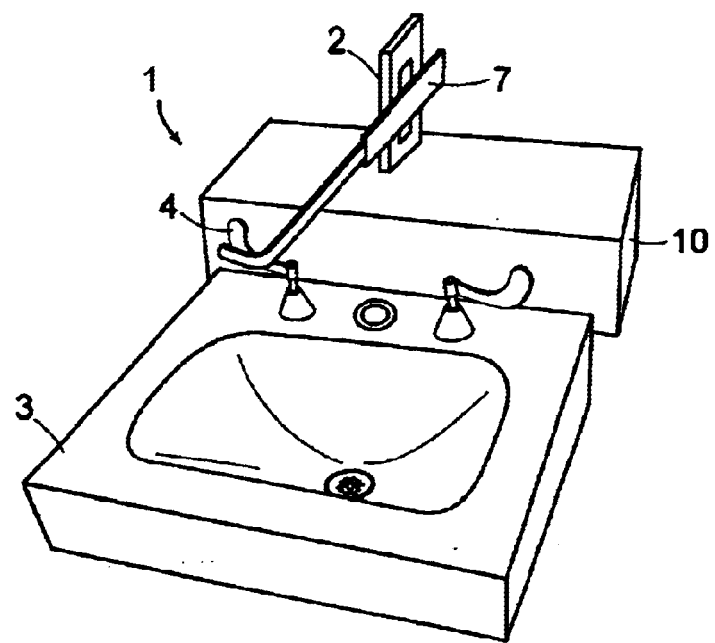
FIG. 3 is a perspective view of an embodiment of the faucet lock of the present invention having first and second brackets adjustably attached to the base.

FIG. 3 shows an embodiment of the present invention locking device 1 comprising base 10, a first bracket 2 adjustably attached to base 10. A second bracket 7 adjustably attaches to first bracket 2 such that the faucet locking device 1 is adjustable in both height and length for with many different faucet arrangements.

Figure 4:
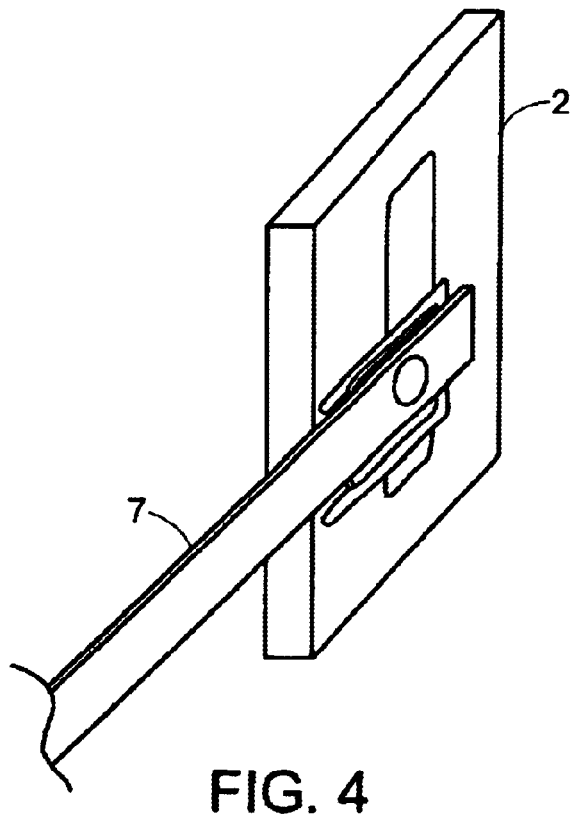
FIG. 4 is a detailed view of an adjustable bracket assembly of one embodiment of the present invention.

FIG. 4 shows one type of adjustable brackets 2 and 7 having both height and length adjustability to be used with various faucet configurations.

It will be readily apparent to those skilled in the art that many modifications to the preferred embodiment of the present invention are possible without deviating from the scope and spirit of the invention. For instance it will be readily understood by those skilled in the art upon reading and understanding this specification and drawings that the present invention can be used with many faucet arrangements. Also understood is that the faucet locking device of the present invention is designed to prevent children and others, especially special needs persons from injuries caused by inadvertent or accidental use of hot water faucets on lavatory sinks, laundry tubs and other applications.

While the present invention has been described with preferred embodiments thereof, it will be understood that many modifications will be readily apparent to those skilled in the art. Therefore, it is intended that this invention be limited only by the following claims and equivalents thereto.

What is claimed is:

1. A faucet lock for use with a lavatory sink faucet having at least one water valve control handle, said faucet lock comprising:

a base;

a bracket, having first and second ends thereof, wherein said first end is adjustably attached to said base such that said second end is positionable adjacent to said control handle preventing said control handle from opening said water valve, thus locking said water valve in a closed position, and wherein said bracket comprises a flexible and positionable material wherein said faucet is locked when said bracket is positioned around said control handle preventing said control handle from opening said water valve;

wherein said faucet lock prevents small children, disabled persons and others from unauthorized use of said water valve.

* * * * *